Figure 1:
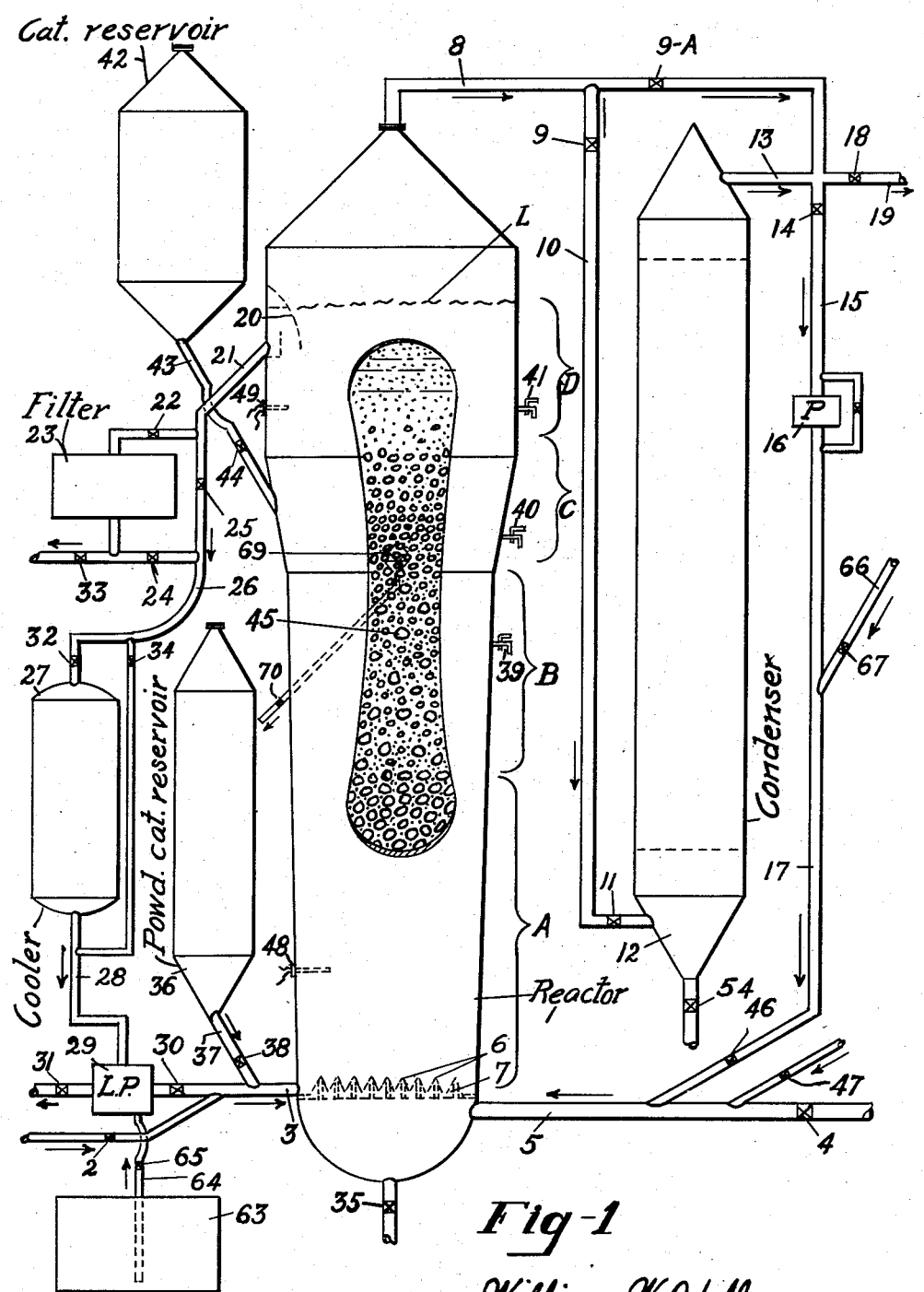

William W. Odell.
Inventor

Dec. 8, 1953  W. W. ODELL  2,662,091
PROCESS AND MEANS OF PROMOTING CHEMICAL REACTIONS
Filed Sept. 25, 1950  3 Sheets-Sheet 3

William W. Odell.
Inventor

Patented Dec. 8, 1953

2,662,091

UNITED STATES PATENT OFFICE 2,662,091

PROCESS AND MEANS OF PROMOTING CHEMICAL REACTIONS

William W. Odell, New York, N. Y.

Application September 25, 1950, Serial No. 186,574

22 Claims. (Cl. 260—449.6)

This invention relates to process and means of promoting chemical reactions; reactions which may be either exothermic or endothermic in nature and which include in particular exothermic reactions in which hydrogen and carbon monoxide take part. In particular it deals with the class of reactions that may be promoted by passing a fluid stream initially containing reactant substance upwardly through a mass of finely divided or small-size solids while said solids are confined in a reactor preferably in a fluidized state, being fluidized by the flowing stream. More particularly this invention relates to the catalytic reaction of gases and vapors, one with another and/or, the reaction of one or a plurality of gases with a liquid as both a liquid and a reactant gas are passed upwardly through a particular mass of small size solids at a velocity adapted to maintain them in a suspended fluidized state in the liquid; solids may be confined in a particular zone of the reactor.

In my application Serial No. 582,692, filed March 14, 1945, now U. S. Patent No. 2,503,291, issued April 11, 1950, the procedure for promoting chemical reactions in a gasiform stream of reactants, as it passes up through a mass of solids, was described. The present invention differs therefrom in that the small-size solids in this case are largely or preferably entirely suspended fluidized in a liquid and not solely in a gasiform fluid; they are confined in a reactor as a deep mass while a fluidizing stream passes up through the mass fluidizing the solids substantially as a deep dense bed in the reactor. In general the fluidizing stream which contains the reactant material is both liquid and gaseous. The small size solids are not necessarily catalytic in nature although it is frequently desirable that they be catalysts; one of the major functions of these solids is to provide a mobile tortuous path for the travel of the fluid stream up through the reactor with minimum formation of large gas bubbles and with uniformity of upward liquid flow through the reaction zone. This invention has to do with control of the temperature of solid catalyst particles suspended in a liquid as gaseous reactants pass up through the liquid contacting the mass of suspended catalyst, as well as with the method of confining the mass of catalyst in the reactor as the gas and liquid stream pass upwardly therethrough.

In present practice, so far as I am aware, fluidized-solids technique is commercially practiced almost entirely with the solids suspended in a gasiform fluid and with the solids largely in the dry state. When reactors of large diameter are employed the solid catalyst particles become excessively heated on their surfaces unless internal cooling means are provided; this condiiton exists, of course, when promoting catalytic exothermic reactions. When the catalyst is suspended in a circulating slurry poor contact of catalyst commonly occurs and considerable amounts of catalyst must be pumped and recirculated. Furthermore, with known customary technique it is not the custom to pass the reactant gas, liquid or both serially through a plurality of beds of different solids of different catalytic activity and/or different buoyancy while suspended in the common fluidizing stream in a reactor.

One of the objects of this invention is to pass a gasiform fluid upwardly through a dense mass of small size contact solids while the solids are suspended in an upwardly flowing liquid under such conditions that the suspended solids in a down-stream portion of said liquid and in an upper portion of said mass exhibit settling characteristics. Another object is to control the temperature of the catalyst solids suspended in a liquid, largely by uniformly circulating the liquid component of the fluidizing stream through the catalyst mass at a controlled rate. Another object is to aid in control of the temperature of the catalyst by introducing cooling fluid into the fluidizing stream at a point between the bottom and top of the body of liquid in the reactor. Still another object is to use a plurality of different catalysts of different buoyancy characteristics and different catalytic activity suspended densely fluidized in different zones in a deep liquid while the liquid flows upwardly serially through the different zones. A further object is to simultaneously pass a gasiform stream initially containing at least one reactant component and a liquid, upwardly through a mass of small-size catalyst particles confined in a reactor at a temperature and pressure favorable for said reactant to react chemically and to promote the reaction under such conditions that the gasiform stream passing out of the said mass and out of the reactor is substantially free from catalyst particles. Another object is to pass a very finely divided solid catalyst suspended in a liquid stream upwardly along with a gasiform stream containing reactant material through a mass of less buoyant small-size solids at a velocity adapted to fluidize the latter solids, and to promote the chemical reaction of said reactant in said stream while passing through said mass. Other objects will become apparent from the disclosures herein made.

In passing a gasiform fluid upwardly through a liquid it is usually found that the bubbles which are initially small are quite large after the gasiform fluid has passed through an appreciably deep portion of the liquid; they are too large for satisfactory contact with a powdered catalyst which may be initially present in the liquid or introduced with the liquid or gasiform stream. If the liquid also travels upwardly through the reactor the desired intimacy of contact of gas and powdered solids or gas with liquid and powder is not attained. When a mass of small size solids of substantially uniform size, within the range, for example, $\frac{1}{16}$ to $\frac{1}{2}$-inch in diameter, are disposed in the liquid and both a gas and an additional amount of the liquid are passed up through the intersticial space of said mass the bubbles are continuously changing shape and size but never get very large as the combined stream passes through the mass. If a fine powder is also introduced into the reactor along with the added liquid, it passes up through the mass, in the stream, and contacts the gas and the larger solids very well and no large bubbles form in the mass. However, when appreciably large amounts of powdered solids are caused to flow upwardly in this manner there is a tendency for channels to form as paths of least resistance through said mass. When the velocity of the stream of upwardly flowing fluid (liquid, gas and powdered solids) is sufficiently great to substantially fluidize the solids of said mass in the liquid there is no channeling but on the contrary a quite uniform flow of the gaseous and liquid components is obtained; the suspended powder passes upwardly through the mass at a rate that is greater as the stream velocity increases. This procedure is a desirable one to follow in promoting catalytic reactions in a liquid; the powder may be the sole catalyst or the mass of solids may be catalyst or both may be catalytic. Again, the solids of said mass may be of different catalytic activity than that of the powdered solids. The solids of said mass may, for example, be a nickel-aluminum catalyst of good heat conductivity and the powder may be, for example, an iron-oxide-type catalyst, a metal powder or other known catalytic substance suitable for promoting a particular reaction. I find that even when the powdered solids are initially present in the liquid in the reactor they pass upwardly through the mass of solids as soon as the upward velocity of the liquid becomes appreciable; the exact velocity is not the same for all powders, it must be greater for very dense particles than for those of low density, and greater for powders of relatively large size particles than those of relatively small particles, other factors being the same.

Because a given mass of a particular solid has greater surface the finer it is subdivided, it is common to employ catalysts as a very fine powder. Normally, extremely fine size catalyst is not desired in the practice of this invention because they do not exhibit any settling tendencies and are difficult to handle and remove from a liquid. a gasiform fluid passing up through a liquid containing an appreciably large concentration of the extremely fine-size catalyst tends to form very large bubbles or slugs and thus neutralizes all the usual advantages in the use of an extremely fine catalyst; the gas-catalyst contact is not good in such cases. However, when a mass of solids, sized about $\frac{1}{16}$, $\frac{1}{8}$, $\frac{3}{16}$ or say $\frac{1}{4}$-inch in diameter, is so disposed in the reactor that is fluidized partly by the force of a liquid flowing up through said mass, a gasiform fluid passing up through said mass simultaneously with the liquid does not readily form slugs; in other words the mass of solids helps materially to cause the latter fluid to travel upwardly over a mobile tortuous course through said mass. It is desirable that the solids be in a state of mild agitation rather than in violent turbulence, hence when promoting reactions at high rates of flow of gas and/or liquid the size of the solids should be larger than when relatively low velocities are employed, when solids of a given density are employed.

I find that when a mass of solids whose particles are about $\frac{1}{8}$-inch in diameter is fluidized in and at least partly by an upwardly flowing liquid in a reactor, a powdered catalyst can be suspended in said liquid and caused to pass with it through said fluidized mass of solids. When this is done, with or without the simultaneous passage of gas up through the mass, the concentration of the suspended powder in the liquid and the rate of travel of said powder upwardly through the said fluidized mass of solids can be controlled by controlling certain variables including:

(a) Size of the powder particles
(b) Specific gravity of the powder particles
(c) Rate of introduction of the powder into the reactor
(d) Velocity of the liquid upwardly through said mass of the relatively large-size solids
(e) Size and density of the solids comprising said mass
(f) Velocity of gas up through said mass
(g) Specific gravity of the liquid
(h) Specific gravity of the gas
(i) Viscosity of the liquid For maximum density or concentration of the powder particles in the liquid flowing up through the said mass of solids, for a given rate of flow of the liquid, the density of said particles should be high, the size should be coarse, the viscosity of the liquid should be low, the rate of introduction of the powder into the liquid should at least equal the rate of its travel through said fluidized mass, the upward velocity of the liquid in the fluidized mass should be that which causes only incipient fluidization of the solids of said mass, the sizes of the solids of said mass should be small and their densities high compatible with incipient fluidization, the specific gravity of the liquid should be low. On the other hand when it is desirable to maintain a very low concentration of the powder particles in the liquid flowing up through the mass of fluidized solids without depending on an increased fluid velocity, the rate of feed of powder may be decreased, or a mass of solids of lower density and greater buoyancy may be employed whereby complete fluidization is obtained, or a liquid of greater specific gravity employed, or the powder particles may be used in a finer state of subdivision, or combinations of these variables may be employed.

Advantage is taken, in the practice of this invention, of the difference in characteristics of solid particles of different sizes when fluidized as will become apparent. Of considerable importance is the relative ease with which a plurality of differently sized solids may be fluidized in stratified layers in a liquid confined in a reactor, by selecting them with reference to their specific gravity. Differently sized solids of the same specific gravity tend to stratify with the largest size solids forming a bottom layer in the liquid, the smallest solids form a layer uppermost in the bed and a middle layer may form containing solids of intermediate size and/or a mixture of sizes in process of segregation; the solids are in suspension in the liquid. When the solids, which may be catalytic and of different catalytic properties, have different specific gravity, they are so sized that they separate in layers in the desired sequence from bottom to top in the bed immersed in the liquid. For example, Raney nickel (an alloy of nickel and aluminum) may be used along with an iron or partly reduced oxide of iron and the size of the solids initially adjusted so that one or the other will be most buoyant and segregate largely in the upper layers of the bed. Again, iron may be used in sizes approximating $\frac{1}{16}$-inch as a material for preferential segregation as a bottom layer in the liquid and Raney nickel may be used in sizes approximating say, $\frac{1}{32}$-inch diameter as the catalyst adapted to segregate in the uppermost layer in the stratified bed. Other solids of known catalytic properties may be used according to the effect desired and to the reactions to be promoted. The invention can be more clearly understood with reference to the figures.

One form of apparatus in which this invention may be practiced is shown diagrammatically in elevation in Figure 1 in which a portion of the reactor wall is cut away to show the interior.

Figure 2:
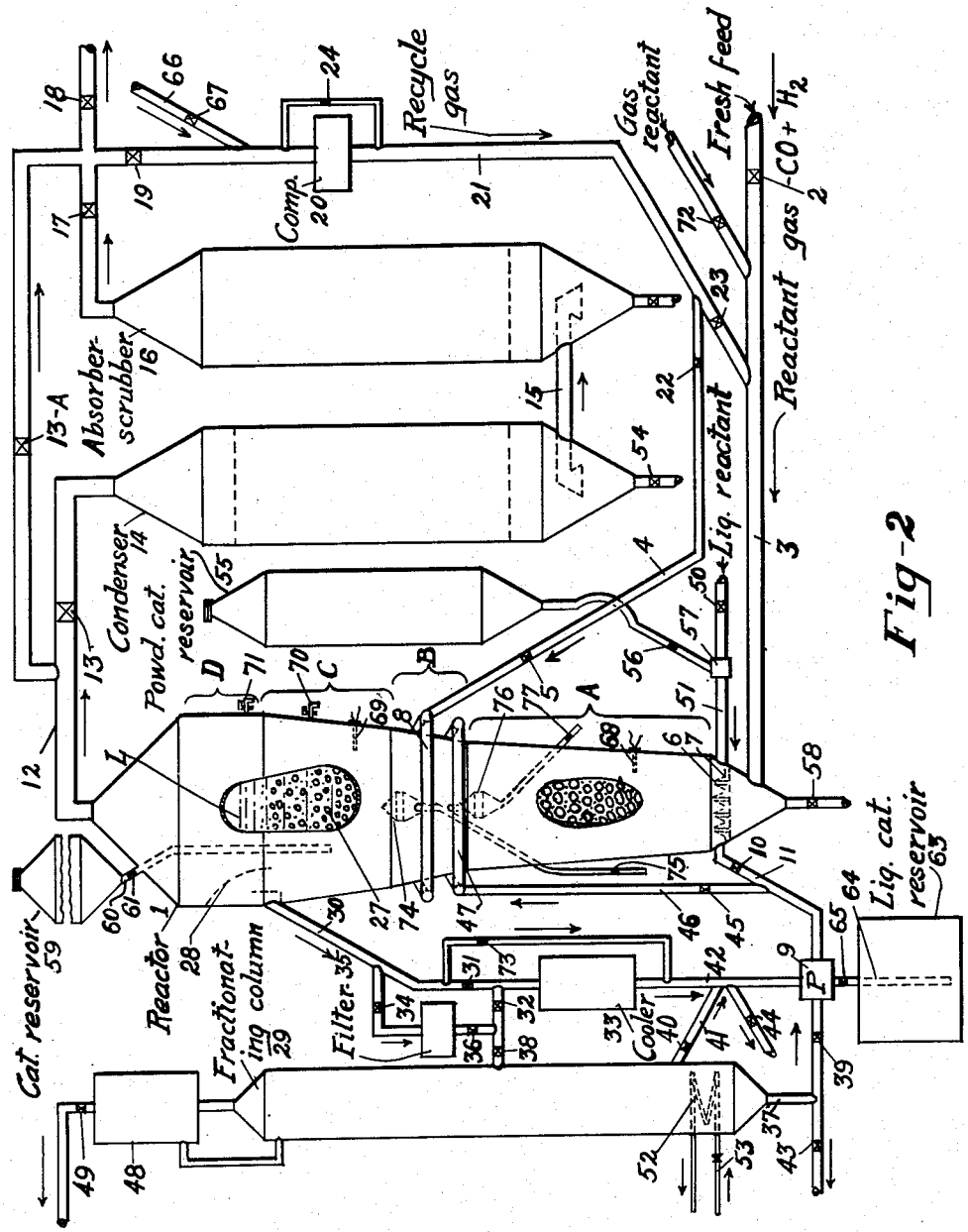

Figure 2 shows diagrammatically and in elevation one form of reactor suitable for the practice of this invention, connected with means for pumping, cooling, condensing and recirculating gases and for returning to the reactor treated liquid products of reaction. A different system of numbering is employed referring to parts of this figure than in Figure 1. Portions of the reactor wall have been cut away to show the interior.

Figure 3:
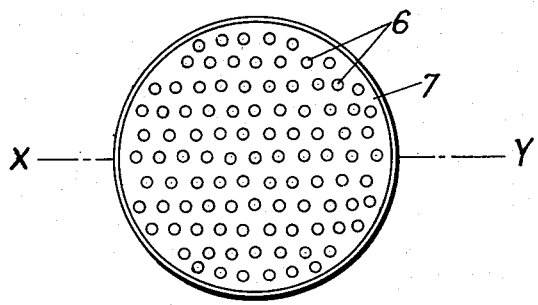
Figure 4:
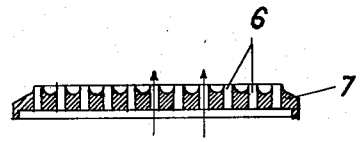

Figure 3 is a top view of the distributing member designated 7 in Figures 1 and 2, and Figure 4 is a vertical sectional view of member 7 of Figure 3 through X—Y.

Referring to Figure 1, the reactor 1 is initially supplied with liquid through valve 2 and conduit 3, with gasiform reactants through valve 4 and conduit 5, and with steam through valve 47 and conduit 5 whereas recycled gaseous fluids are introduced through valve 46; all of the gasiform fluids entering the bottom portion of the reactor pass through the nozzles 6 in distributing member 7 which is specifically designed to direct said gasiform fluids upwardly uniformly into the reactor. Gases may be discharged from the reactor through offtake 8, valve 9 and conduit 10, valve 11, condenser 12, offtake 13, valve 14, pump 16, conduit 17 and valve 46 back to the reactor and the portion not desired for recirculation is discharged from 13 through valve 18 and conduit 19 leading to a recovery system of know design. Means whereby liquid may be withdrawn from the upper portion of the reactor, cooled with or without filtering and at least in part returned to the reactor, are provided whereby the liquid passes from under hood 20 through offtake 21, valve 25, conduit 26, valve 32, cooler 27, conduit 28, pump 29, valve 30 and conduit 3 to the base of the reactor. When the thus recycled liquid is filtered before its return to the reactor the path of travel is from offtake 21 through valve 22, filter 23, valve 24, conduit 26, valve 32, cooler 27, conduit 28, pump 29, valve 30 and conduit 3. A portion of the recycle liquid may travel over each of the foregoing courses. Means for discharging excess of liquid from the reactor are provided by pump 19 and valve 31 and also by valves 25, 24 and 33. The solids are shown, immersed in the liquid, through the cutaway portion of the reactor wall at 45; the largest or rather the least buoyant solids are densely confined largely in the lower tapering portion zone A of the reactor, solids of different catalytic activity and of somewhat greater buoyancy from a dense layer at a higher level, as in zone C, whereas zone B is a dense zone of mixed solid catalysts and zone D is a zone of greater dispersion of the least buoyant coarse grain catalyst and may be substantially free of these particles. The powdered catalyst particles initially confined in reservoir 36 may flow through conduit 37 and control valve 38 into the system and pass up in the reactor at a slower rate progressively through zones A, B and C and may be more concentrated in zone D than in A; they pass out of the reactor with the liquid through 21 when the rate of flow of the fluid stream up through reactor 1 is great and the particles are very small, but when the liquid stream flow-rate is not high and when the catalyst particles are not too buoyant or fine they tend to concentrate in the liquid in zones B and C and only very small amounts pass out with the liquid withdrawn through 21. When both liquid and gaseous reaction products are made in reactor 1 and the powdered or added catalyst is the major catalyst promoting the desired reactions, the liquid may be discharged through 21, at a rate adapted to maintain the liquid level L in the reactor, passing as thus withdrawn through 25, 26, 32, 27, 28, 29, 30 and 3 back to the reactor, removing only the accumulated excess liquid through 24 and 33 or through 22, 23 and 33; in this manner the concentration of the fine or powdered catalyst in zone A may be greater than otherwise. Means are provided by pet-cocks 39, 40 and 41 for withdrawing samples of the liquid from the reactor at the different levels for test purposes and to determine the concentration of suspended powdered catalyst. The coarse catalyst reservoir 42 supplies catalyst through conduit 43 and valve 44 to the reactor. Valve 35 is for withdrawing any accumulation of liquid in the base of reactor 1 and valve 54 is for draining condensate from condenser 12. Liquid catalyst or special liquid reactant is fed to the reactor from reservoir 63, through conduit 64 and valve 65 whereas gasiform catalyst is supplied through conduit 66 and valve 67. Bypass valve 34 is used to regulate temperatures in the reactor by allowing controlled amounts of uncooled, recirculating hot liquid to bypass cooler 27 enroute to circulating pump 29.

Referring to Figure 2 in which a different system of numbering is employed, the reactor 1 has a lower tapering portion A and an upper tapering zone C, a middle tapering zone B, a supply line 3 with control valve 2 for admitting a gaseous reactant fluid to the bottom thereof, means for admitting recycle gas thereto from compressor 20 through valve 22, conduit 4, valve 5 and connected bustle-pipe 8, a pump 9 for supplying liquid through valve 10 and conduit 11, and an offtake 12, valve 13 for gasiform fluid products which leads to condenser 14, having offtake 15 for the latter fluid which leads to scrubber-absorber 16. The scrubber 16 is so connected that the gas discharged therefrom may pass in part through offtake valve 17 and valve 18 and a controlled amount may pass through valve 19 compressor-booster 20, conduit 21, valve 23 to conduit 3 for recirculation through reactor 1; valve 24 is a bypass control valve or check valve which allows compressor 20 to operate even though valves 23 and 22 are suddenly closed. Grid 7 supports the sized solids when they are not fluidized and has spaced jets or nozzles 6 as in Figure 1. The solids shown at 27 are in suspension in the liquid which has a level L. Baffle element or hood 28 is so disposed in reactor 1 that liquid may be withdrawn therefrom through offtake 30 and caused to pass through valves 31, 32 and 33 to fractionating column 29 or through valve 34, filter 35 and valves 36 and 38 to the latter column. The column 29 is so connected to pump 9 and reactor 1 that liquid may be withdrawn therefrom through valve 40 and conduits 41 and 42 or through conduit 37 and valve 39, and returned to reactor 1 through valve 10 and conduit 11; similarly liquid from the top zone of the reactor may be returned directly to the bottom of the reactor by means of pump 9, conduit 30, valve 31, cooler 33, conduit 42, valve 10 and conduit 11. Valve 39 controls the withdrawal and recirculation of heavy (high-boiling-point) liquid from the fractionating column whereas excess of hydrocarbons of lower molecular weight passing up through reflux condenser 48 are discharged through valve 49, usually at a pressure lower than is maintained in reactor 1. Valve 54 permits withdrawal of condensate from condenser 14. A temperature control coil 52 in column 29 is supplied with hot or cooling fluid in accordance with requirements through conduit 53. The liquid level L is such that the solids 27 are completely immersed in liquid. Valve 43 permits the discharge of excess liquid products of high molecular weight from the system. Means for introducing partly cooled fluid (liquid) from pump 9 to the middle portion of the reactor are provided by valve 45, conduit 46 and bustle pipe 47, which pipe has connections spaced around the reactor for the flow of liquid thereto. Powdered catalyst reservoir 55 is adapted to supply catalyst through valve 56 and injector 57 to the reactor by virtue of fluid flowing through conduit 51 and control valve 59. Similarly, liquid catalyst reservoir 63 supplies catalyst through conduit 64 and valve 65 to the intake of pump 9 in amounts desired in the reactor. Conduit 66 supplies gaseous catalyst through control valve 67 to the intake of compressor 20 from which it passes on into the reactor with gas circulated from the compressor, when a gasiform catalyst is desired. Granular or coarse solids which usually are catalyst solids may be supplied to reactor 1 from reservoir 59, through conduit 60 and valve 61. Although it is desirable in promoting certain hydrocarbon synthesis reactions to employ two different kinds of solids, catalysts, which are sized for example in the range 1 to 2 millimeters diameter and, which different catalysts have different buoyancy properties in the liquid such that when fluidized a plurality of stratified layers of the solids are formed whereby the bottom layer is comprised largely of the other, most buoyant, catalyst, the desired effect is aided by the tapering wall reactor.

Referring to Figures 3 and 4 the elements 7 comprises essentially a base plate with mounds and valleys, with a plurality of spaced nozzles 6 extending from the under side up through the mounds whereby a fluid reactant, particularly a gasiform fluid, may be passed upwardly into the liquid above the plate (Figure 1 and 2) through the nozzles. These nozzles are uniformly bored, that is, they have the same open space for the transmission of a fluid, whereby they function as a plurality of orifices which provide a uniform flow of the gasiform fluid into the liquid over the area covered by said element. The numbering in these 2 figures is the same as in Figures 1 and 2.

*Example 1*

Production of city gas from water gas, namely, from a mixture of CO and $H_2$. Operating at 200 pounds pressure and 580° F. in the catalyst bed, and with reference to Figure 1.

Inlet gas composition:

| | Per cent by volume |
|---|---|
| $CO_2$ | 1.0 |
| CO | 35.0 |
| $H_2$ | 62.5 |
| $CH_4$ | 1.0 |
| $N_2$ | 0.5 |
| Total | 100.0 |

Hot paraffin, paraffin oil or a mixture of the two, is supplied to reactor 1 through conduit 3 by opening valve 2 until reactor 1 is about ¾ full. Valve 9 is closed, valves 9–A and 14 are opened and compressor 16 is started to circulate water gas which is initially supplied through valve 4. Valve 2 is now closed and a catalyst, comprising nickel and aluminum, which preferably has been previously treated with hot hydrogen, and of particle size 1 to 2 millimeters diameter is supplied to reactor 1 from reservoir 42 by opening valve 43. The quantity of catalyst thus added will bring the level of the liquid (oil) in 1 up to the draw-off level or L. Pressure is built up in the system to about 200 pounds gage and sufficient purified water gas is now admitted through valve 4 to promote reaction and to bring the temperature in 1 up to about 580° F., the excess of gaseous products being removed through valve 18. Circulating pump 29 is now started and the liquid from the top portion in reactor 1 is caused to flow from under hood 28 through 21, 25, 26, 34 and 26 to said pump and on through 30 and 3 back to the reactor. The velocity of the liquid up into the catalyst mass is now maintained somewhat above the free settling velocity of the catalyst in zone A. The latter velocity can be separately determined with a small quantity of the catalyst particles or it may be determined by observing differential pressure in the reactor over a given depth of bed and computing bed density at different velocities, as in the customary practice with fluidized solids technique using a gasiform fluidizing agent. Now, particles of a different catalyst, particle size in the range 1 to 2 millimeters diameter, of lower density than the first mentioned catalyst and comprising essentially alumina (preferably activated) containing relatively a very small amount iron incompletely reduced, that is, the iron is not in the metallic state, are introduced from the same reservoir 42 by opening valve 43. The density of the latter catalyst will usually be in the range 2.0 to 4.0 although it can be so prepared that its apparent specific gravity is less than 2. The quantity of the latter catalyst added is sufficient so that some of these solids are in suspension in the liquid in zone C and this can readily be determined by use petcock 40. The level of the liquid tends to increase with the latter addition hence it is necessary to allow sufficient oil to pass out of the system through valve 31 to maintain level L in the reactor. The apparatus is now ready for continuous operation. Purified water gas is now admitted under control, through valve 4, initially setting the flow up through the bottom of zone A at a space velocity of about 1000 cu. ft. per hour of gas measured at standard conditions, per cu. ft. of catalyst present, based on settled catalyst. Valve 9 is opened, valve 9-A is closed, valve 18 is opened and valves 14 and 46 are closed. Oil-line valve 32 is opened sufficient to maintain the temperature in the submerged catalyst bed at about 580° F. When maximum cooling of the recirculated oil is desired valve 34 is entirely closed, whereas when minimum cooling is desired 34 is largely open. The combined flow of oil and water gas up into the reactor is sufficient to maintain the solids (catalysts) fluidized in stratified form but insufficient to cause the coarse 1 to 2 millimeter particles to pass out with the oil through offtake 21. Under these conditions, without any gas recirculation, the products are largely gaseous. Results attainable are as follows:

*Composition of dry product gas, volume per cent*

|  | Raw Gas | $CO_2$ free Gas |
|---|---|---|
| $CO_2$ | 9.5 | 0.0 |
| CO | 23.8 | 26.3 |
| $H_2$ | 54.6 | 60.3 |
| $CH_4$ | 7.1 | 7.9 |
| $C_2H_4$ | 0.8 | 0.9 |
| $C_2H_6$ | 1.3 | 1.4 |
| $C_3$ hydrocarbons | 1.4 | 1.6 |
| $C_4$ | 0.8 | 0.8 |
| $N_2$ | 0.7 | 0.8 |
|  | 100.0 | 100.0 |

B. t. u. per cu. ft_____ 470
Gas yield per 1000 cu. ft. of water gas.
 ($CO_2$ free product)_____cu. ft__ 614
Yield of light oil per M. of water gas__gal__ 0.105

By controlling and adjusting the operating temperature and pressure, and by adjusting the ratio of the different catalyst quantities as well as by varying catalyst composition results attainable may be materially altered. Activity of most catalysts increases as the temperature is increased. The limit on temperature in this particular example is the cracking temperature of the oil or wax used. Employing higher temperatures higher pressures are required as the cracking temperature is approached. As the quantity of nickel catalyst is reduced relatively, and the amount of iron and alumina increased, the amount of low-boiling readily condensible hydrocarbons produced increases.

It will be noted that the fluid flow rate required by maintaining the solids in a suspended state is dependent on size and density of the solids and not on the depth of the bed. Therefore, for a given diameter bed of fluidized catalysts, increasing the bed depth decreases the space velocity or, expressed differently the velocity of gas into the reactor may be greater with deep than with shallow beds, other factors being the same. As gas velocity is increased the quantity of liquid necessary for fluidization decreases somewhat, and when this recirculation rate is decreased more cooling is required in cooler 27.

Higher B. t. u. gas can be made by selecting the catalysts and the blend of catalysts and adjusting operating temperature and pressure. Nickel favors the production of chiefly methane; when the $H_2$ to CO ratio is above about 1.2 to 1 a conversion of 80% of the CO and $H_2$ can readily be made with this catalyst. In this case the yield of liquid products is a minimum, whereas increasing the relative amount of an iron type catalyst relative to the nickel catalyst increases the proportion of liquid products.

It is usually desirable to maintain an appreciably deep bed of mixed catalyst with the denser catalyst solids forming a bottom layer below the mixed layer, and an upper layer of the less buoyant, less dense catalyst above the mixed layer. This is accomplished by selecting say two different catalysts of appreciably different densities and each having about the same size range. If the densities are too widely different and separation is too sharp the denser catalyst can be ground to finer size to offset this effect. On the other hand when the densities of the two catalysts are not appreciably different it is desirable to employ coarser sizing for the denser catalyst than for the least dense catalyst. The tapering wall of the reactor is particularly helpful in providing the desired effect. Thus, the velocity of fluid up through the bed is highest in the bottom of zone A where it is sufficiently great to prevent complete settling, decreasing upwardly whereas at the top of zone A the settling rate of the denser catalyst is appreciably greater and some settling is manifest. In zone B the less dense solids are mixing with the smaller sizes of the denser catalyst forming an intermediate dense layer comprised of particles of both catalysts. In zone C the least dense (least buoyant) solids would be suspended and to some extent untrained in the circulating liquid were it not for the sloping reactor wall which causes such a decrease in the liquid flow in this zone that settling is manifest. Thus zone C is a dense zone of the least-dense catalyst solids in a state of suspension, and turbulent motion and settling is manifest in the upper part of zone C.

I find that the required minimum velocity of the circulating liquid passing into the reactor through pump 29 (still referring to Figure 1) can not be accurately calculated for a given catalyst in a specified size range. In Example 1 the liquid superficial velocity in zone A may approximate 5 to 15 centimeters per second and at this velocity the gas superficial velocity at the bottom of zone A may approximate 1 foot per second in this example, measured at standard conditions. Under these conditions a difference in temperature between the outlet and inlet recirculating oil need not be over about 50° F. that is the cooling supplied by cooler 27. The exact velocities of gas and liquid will vary with results desired and with the particular conditions as to catalyst activity, catalyst size and density and on the conversion which varies with catalyst activity. The fluid velocities in all cases should be sufficient to maintain the solids in zone A in suspension in the liquid. The temperature is accurately controlled by the regulation of valves 32 and 34 of Figure 1. Condensed products are removed from condenser 12 through valve 54. When excessively high velocities of fluid up through the reactor are employed or suspected this condition can be checked by the use of petcock 44; liquid drawn off through 41 should be substantially free of coarse grain catalyst solids and the overflow under hood 20 and out through 21 should also be substantially free of coarse solids when the fluid velocity is not excessive.

The velocity of settling of solids in a stationary liquid varies substantially as the square root of the diameter of the solids. In order to prevent the largest size particles from completely settling out as a fixed or settled bed it is necessary that the fluid flow upwardly must have a velocity somewhat greater than the free settling velocity of the least buoyant solids; this applies to conditions where the solids are not densely dispersed in the liquid, namely in the upper zones C and D of Figures 1 and 2. With hindered settling wherein the mass of solids dispersed in the liquid is large, as in zones A, B and the lower portion of zone C of the latter figures, a different set of conditions apply and the larger and more dense particles (least buoyant particles) tend to segregate as a bottom stratum. Thus in this invention stream velocity up through the bed of particles of catalysts of different buoyancies is such that hindered settling occurs in a lower zone of the liquid in the reactor and free settling occurs in a relatively higher zone thereof whereby the solids of lowest buoyancy form a bottom stratum and those of greater buoyancy form an upper or higher stratum in the liquid in the reactor. Referring to Figure 1 in order to prevent the least buoyant solids from actually settling out of the liquid the stream velocity is maintained above the settling velocity of the least buoyant solids in the bottom of zone A.

Before citing another example, and still referring to Figure 1, attention is called to the matter of draining any accumulated liquid from the bottom of reactor 1 from beneath 7 by opening valve 35 as often as necessary. The jets 6 being uniformly bored allow the gas from conduit 5 to pass uniformly through the different jets hence appreciable amounts of liquid should not accumulate in this bottom region. The hot return oil from pump 29 enters the reactor around these jets and prevents the chilling of paraffin on or in the jets.

A modification of the operation described in Example 1 may be made by recirculating a portion of the reaction gaseous products by opening valve 14 and operating compressor 16 at a speed chosen to give the desired amount of recirculation, and opening valve 46. When making low B. t. u. gas, recirculation of the gas is sometimes beneficial without first removing $CO_2$ produced during reaction in the reactor but when a very highly active catalyst is used and conversion of 80% or more (CO+$H_2$ converted to hydrocarbons) is obtained the $CO_2$ content of the product gas may be so high that its recirculation exerts a deleterious effect on results and increases materially the formation of carbon. Up to about 10% of $CO_2$ in the total feed the effect of $CO_2$ on carbon formation is negligible. Hence, with high recirculation rates it is preferable to remove at least some of the $CO_2$ before recirculating product gas. Recirculation is a means of meeting changing demands for product gas while maintaining proper conditions in the reactor. A higher yield of condensible products obtains with product gas recirculation than without it. Recirculation promotes complete conversion of the CO and decreases the degree of unsaturation in the product gas when the $H_2$ to CO in the total feed is of the order of 1.5 to 1.0 or higher.

Still referring to Figure 1 a gaseous catalyst, such for example as $BF_3$, $NH_3$ $Fe(CO)_5$ (boils at 102° C.), $AsF_5$, $Ni(CO)_4$ and the like may be introduced to promote particular effects by opening valve 67 in conduit 66 and also opening valve 46. Liquid catalysts may be introduced into the reactor with the recirculating liquid by opening valve 65 in conduit 64. Such catalysts include, oily solutions of metal oleates such as those of manganese copper, cobalt and zinc, heavy metal salts of fatty acids other than oleic acid, and oil soluble compounds of copper, iron, cobalt, nickel, and manganese. When the pressure is sufficiently high to prevent too rapid evaporation of toluene and xylene, either or both of these may be introduced into the reactor through 64 and valve 65 in desired amounts; they may replace to a large extent the paraffin oil. For example, xylene at 33 atmospheres pressure boils at approximately 575° F. hence at the latter temperature it is desirable that the pressure exceed 33 atmospheres in order that appreciable amounts of xylene remain in the liquid phase. By supplying the xylene as a liquid and allowing some vaporization to occur in the reactor a cooling or heat absorbing effect is produced.

When very coarse grain catalyst solids are employed with the accompanying high stream velocity it is most helpful, to control temperature and regulate settling rates of the solids, to withdraw some of the circulating liquid from reactor 1 from a zone between the top and bottom thus providing a lower upward velocity of flow of liquid in an upper zone than in the bottom zone A. This is an important part of this invention and means for accomplishing it are shown by internal screened-top offtake funnel 69 and external control valve 70. With very deep beds a plurality, preferably 3, of these discharge units spaced vertically apart may be advantageously employed.

*Example 2*

Conversion of water gas to hydrocarbons that are largely liquid at normal temperature and pressure, reference being made in this example to Figure 2.

Starting with the same kind of water gas as in Example 1, the operation is conducted substantially as described under that example but with the following differences: The catalyst employed is a reduced iron oxide which contains sodium and potassium carbonate as promoters in amounts approximating 0.3 to 0.5 per cent of each calculated as $Na_2O$ and $K_2O$ and as per cent of the total dry reduced catalyst. The catalyst also contains alumina 4.8 per cent. The size of the catalyst particles in this case is 1.0 to 2.0 millimeters diameter. The catalyst is reduced before use in $H_2$ at 800° F.

The conditions of operation are as follows:
Temperature in reactor_____°F__ 580–590
Pressure in reactor_____lbs. gage__ 800
Circulating liquid, paraffin and paraffin oil.
Recycle of product gas, substantially freed of $CO_2$, ratio 2 volumes of recycle to 1 of fresh feed.
$H_2$ to CO ratio in fresh feed gas__ 1.78 to 2.0:1

In starting operations bypass valve 13-A is used in a similar manner as 9-A of Figure 1 in Example 1; it is closed when normal conditions prevail and valve 13 is then open. In this example the water gas under pressure passes through valve 2 and conduit 3 into reactor 1 and passes up into the submerged catalyst bed through nozzles 6 in element 7. Hot gasiform reaction products pass out of reactor 1 from above the liquid medium through 12, 13, 14, 15, 16 and 17, a portion passing through valve 18 and the remainder, after removing the major portion of the $CO_2$ from the gas in scrubber 16, passing through 19, 20, 21, 23, and 3 back to the reactor. A portion of this recirculated gas may be directed into the reactor at a midway zone, through 22, 4, 5 and 8; it is sometimes advantageous to do this for the purpose of improving solids stratification by controlling stream velocity in the upper portion of the liquid mass in reactor 1 independent of the velocity in the lower zone. It is also advantageous in obtaining good temperature control in the fluidized mass of solids, particularly when using low liquid recirculation rates which are possible with small size solids when there is a tendency for the temperature to be higher in the bottom zone A. The thermocouples 68 and 69 are useful as a guide in regulating temperatures in the reactor. The introduction of recirculating gas through 4, 5 and 8 is particularly beneficial when the ratio of total recycle to fresh feed is very low. The reaction products passing through the condenser 14 give up by condensation a large portion of the total liquid products made and are removed through valve 54. Gasiform products passing out through valve 18 are suitable for distribution as combustible gas or they may first be contacted with a solid or liquid adsorbent or absorbent for the removal of propane and butane ($C_3$ and $C_4$ hydrocarbons) by known methods.

The recycle liquid in this example passes from reactor 1 from beneath hood 28 through 30, 31, 32 and 38 to a fractionating column 29 not shown in Figure 1. By maintaining the pressure in 29 lower than reactor 1 vaporization of the low-boiling products, present in the liquid as discharged from 1, occurs automatically with a lowering of the temperature of the remaining liquid. The vapors thus formed in 29 pass up through reflux condenser 48 and offtake valve 49 and on to known means for recovering them. The heavy or high-boiling components remaining in the liquid phase pass down through 29 only at the rate determined by the use of valves 43 and 39. The amount required for recirculation is passed through 39, pump 9, valve 10 and conduit 11 to the reactor, whereas accumulations are removed from the system at a rate adapted to maintain the level of liquid in 1 at L through valves 43 or 44. The major portion of the liquid recirculation may be made similarly as in Example 1, by withdrawing the liquid through 30, 31, 33 and 42 by pump 9 and forcing it back into 1 through 10 and 11, but because it is usually desirable to remove from the liquid excessive amounts of products boiling at temperatures lower than the initially supplied paraffin and paraffin oil, it is preferable to pass at least a portion of the liquid discharged through 30, through the fractionating column 29 as described. When appreciable amounts of fine particles of catalyst, products of attrition, pass out of 1 suspended in the liquid removed through 30 it is possible to remove these by causing the liquid or a part of it to pass preferably continuously through 34, filter 35 and valve 36; the portion to be supplied to 29 passes through valve 38 and the portion circulating directly back to the reactor passes through valve 32, cooler 33 and pump 9 on to the reactor. As a further means of temperature control in the reactor and also control over bed density in the different zones, some of the recirculating liquid may be passed from pump 9, through 45, 46 and 47 to the region intermediate the top and bottom of the liquid in 1. As in Example 1 the solids are kept in a fluidized state but chiefly in zones A, B and C below top zone D.

The composition and yields of products are substantially as follows:

Conversion of CO in the feed gas, per cent__ 82.4
Carbon in the hydrocarbon products accounted for by the different products are:

| | Per cent |
|---|---|
| $C_1+C_2$ | 18.8 |
| $C_3$ | 15.0 |
| $C_4$ | 13.2 |
| $C_5$ to 400° F. | 44.3 |
| Heavy hydrocarbons | 8.7 |
| | 100.0 |

The composition of the gaseous stream discharged from scrubber 16 through valves 17 and 18, before recycle of gas is initiated or when no gas is recycled is:

| | Per cent by volume |
|---|---|
| $CO_2$ | 2.9 |
| CO | 18.1 |
| $H_2$ | 56.5 |
| $CH_4$ | 11.1 |
| $C_2$ | 3.7 |
| $C_3$ | 2.9 |
| $C_4$ | 2.8 |
| Higher hydrocarbons | 0.5 |
| $N_2$ | 1.5 |
| | 100.0 |

The foregoing is the gas scrubbed for $CO_2$ removal but with some $CO_2$ still present. The volume of this gas per 1000 cu. ft. of water gas passed through the reactor is approximately 340 cu. ft. (dry basis), and the calorific value is 663 B. t. u. It will be noted that the $H_2$ to CO ratio is higher in the product gas than in the water gas, hence when product gas is recycled a beneficial effect of increasing the $H_2$ to CO ratio is obtained. Attention is called to the fact that even at the prevailing high pressures substantially all of the propane and butane and some of the pentane remains in the gaseous state, hence when a maximum recovery of propane and butane ($C_3$ and $C_4$ hydrocarbons) are desired the product gas should contact a solid adsorbent or the equivalent before recycling. The latter procedure for recovering $C_3$ and $C_4$ is well known and is not shown in the drawings for simplicity. The condensed liquid products are recovered from the condenser by opening valve 54. When the recycle gas is free of $C_3$ and $C_4$ it may be introduced through valve 72 and conduit 3.

In this example (2) the temperatures, and pressures may be varied over an appreciable range within the limits of this invention. Also rates of flow of the fluids may be varied to suit any particular set of conditions so long as the desired bed stratification is maintained. Here, using a single kind of catalyst in a plurality of different sizes, the largest particles tend to settle at the bottom, that is, they have a faster settling rate than the smaller particles, and the different strata include: a bottom layer comprised largely of the coarsest size particles, a middle layer of mixed sizes and a top layer of the smallest size particles. If the diameter in the upper zone C of the reactor of Figure 2 is too large for a selected size and density of the least buoyant solids so that they settle too rapidly this is corrected by increasing the liquid circulation rate in the upper portion of the reactor by the use of valve 45. Test cocks 70 and 71 may be used to determine approximate settling condition. In taking these samples a tightly connected pressurized, metal sample bottle should be used.

In carrying out the operations of Example 2 it will be found that in general high pressures favor the maximum conversion of CO to hydrocarbons and the maximum yield of liquid hydrocarbons and also favors minimum carbon formation whereas relatively low pressures favor gas formation. Furthermore a highly reduced iron favors the maximum production of liquid hydrocarbons, and a minimum amount of promoter such as sodium oxide and potassium oxide favors gas production and a reduced catalyst (iron type) containing as much as 10 to 12 per cent of combined oxygen is preferred for this purpose.

*Example 3*

Synthesis of hydrocarbons from water gas employing coarse grain solids and a circulating finely-divided catalyst. Reference is made to Figure 2.

The operations are substantially as described for Example 2 except that the coarse grain solids comprise chiefly $Al_2O_3$ in a size range as initially supplied to the reactor 1 of approximately 1.0 to 2.0 millimeters. The powdered catalyst comprises chiefly partly reduced iron oxide containing 5 to 12% of oxygen. This catalyst contains 5.0% alumina, 0.5% copper and 0.5% $K_2O$; the particle size is of the order of 50 to 100 microns. When operation is established as described for Example 2, the powdered catalyst is supplied from reservoir 55 by opening valve 56 and causing the powder to be injected into the reactor by liquid carrier, paraffin and paraffin oil, introduced through 50 and 51. This is continued until the mass (weight) of the powder in reactor 1 is about 10 per cent of the weight of the granular alumina. Now valve 56 is closed and the powder is carried upwardly through the submerged granular solids in the circulating liquid; it passes in suspension in the latter liquid out of 1 through 30, valve 73 and conduit 42 to pump 9 from which it is pumped through 10 and 11 back into the reactor. In passing up through the fluidized solids it flows serially through the dense bottom stratum A, the intermediate stratum of mixed sizes B and finally through an upper stratum C of finer size-solids. The rates of liquid circulation are substantially as described, being sufficient to keep the granular solids from settling. The flow of water gas is similar to the previous examples and it enters the reactor through 2, 3 and nozzles 6. Recycle of gas may be employed as described. The results are similar to those of Example 2 only the effect of high pressure is no so pronounced; the pressure in this case is 350 pounds absolute. Liquid and gaseous hydrocarbons are produced. The cooling of the circulating oil is accomplished by directing some of the oil through valve 31 and cooler 33 to maintain the chosen temperature in the reactor. In this example the coarsely sized particles of alumina are supposedly not catalytic to hydrocarbon synthesis but I find that when the amount of powdered catalyst in suspension in the circulating liquid is reduced to a very small amount approximating 0.5% 1.0% synthesis reactions occur, which leads to the conclusion that the alumina, in submersion, is catalytic to this type of reaction. It will be obvious that by changing the catalytic nature of the coarse-grain solids and/or the powdered catalyst various modifications in results may be obtained. Certain catalysts tend to promote wax formation and certain other catalysts promote chiefly gas and liquid products. It has been shown that two different coarse-grain catalyst solids may comprise a plurality of different catalysts, preferably 2, of different buoyancy properties; this is also applicable in the practice as in Example 2, and under these conditions sharper control may be obtained over the nature of the reaction products. The major variables to be adjusted in obtaining the various effects include:

(a) Relative amounts of the different coarse-grain catalysts used.
(b) Kind and activity of the coarse-grain catalysts.
(c) Kind and activity of the powdered catalyst employed and its concentration in the circulating liquid.
(d) Temperature, pressure and rate of circulation of the liquid.
(e) The ratio of $H_2$ to CO in the feed gas.
(f) The amount of recycle gas used per unit of fresh feed.
(g) The use of organic compounds of heavy metals, adapted to function as catalysts, in solution in the circulating liquid, and
(h) The use of gaseous substances in the recycle gas or in the fresh feed gas which affect the pH of the circulating liquid and gas and/or which are catalytic to the reactions promoted. $NH_3$ for example, with or without steam, has a pronounced influence on pH.
(i) Particle size and density of the different coarse grain solids.

In the foregoing examples the coarse solids were chosen at 1 to 2 millimeters in diameter. The size selected may vary, but within narrow limits, since it is found that with coarse, dense solids the rate of settling is so great that a high liquid recirculation rate is required to prevent them from settling out of suspension. Since two important purposes of liquid recirculation are to control temperature and fluidize the solids in stratified form, it is a waste of energy to circulate the liquid at a greater rate than is required to dissipate the heat of reaction. Accordingly the maximum size density relation (buoyancy) of the least buoyant catalyst solids should be such, referring to Figure 2, that they will remain in suspension largely in zone A when the rate of flow of the liquid up through the latter zone is sufficient to carry away the liberated heat of reaction. Variations in the rate of circulating the liquid may be made without disturbing temperatures in the fluidized mass by regulating pump 9 and valves 31 and 73. The sloping reactor wall makes possible the use of higher velocities without carry over than is possible in cylindrical vessels. The maximum economical size for dense, coarse solids is about 2 millimeters and the minimum size is greater than that which readily forms a slurry of such a low settling rate that they carry over in the turbulent liquid discharged from the reactor through 30; this minimum, for solids of density 3.0 is about 150 microns when the velocity of the liquid in the upper portion of the reactor is not excessive.

The foregoing examples have been cited to show the applicability of a stratified bed of fluidized solids in promoting chemical reactions when the solids are immersed in a liquid. Other reactions and other types of reactions may be promoted in the practice of this invention. In conducting certain types of reaction the dissipation of heat is not so important and the stream velocity is regulated chiefly to maintain the solids in the proper state of fluidization and to favor the particular reaction. Thus the gasiform fluid may be air and the circulating liquid may be the medium to be oxidized and the solids may be the catalyst adapted to promote the oxidation of at least one component of said liquid. Referring to Figure 2, when the liquid in circulation is to be treated, and recirculation is not desired, the liquid passes through the reactor without direct recirculation or, with partial recirculation; the path of the liquid may be through 50, 51, 6, up through the fluidized solids and out through 30, 31, 33, 42 and 44, or it may pass through 30, 34, 35, 36 and 38 to the fractionation column 29 from which the relatively low-boiling products pass out under somewhat reduced pressure through 48 and 49, overhead, and the higher-boiling products are discharged through 37 and 43.

A means of fine adjustment of the settling rates of the solids is shown by the interior liquid offtakes 74 and 76 and the corresponding external liquid-discharge control valves 75 and 77. The use of the latter valves not only controls settling rates and bed density in zones B and C of reactor 1 but it also decreases the rate of travel of the liquid through the top zones C and D which is desirable with highly reactive catalysts in zone A. Thus a high liquid velocity may be employed in zone A and a lower velocity in the upper zones.

Example 4

Making chiefly liquid hydrocarbons from water gas employing as the major catalyst finely divided (powdered) highly reduced iron catalyst containing 1.2 per cent copper and 0.5 per cent $K_2O$; referring to Figure 2.

| | |
|---|---|
| Size of powdered catalyst, approximately 50 to 100 microns. | |
| Pressure, lbs. gage | 155 |
| Circulating liquid; heavy oil product from previous similar run. | |
| Concentration of powdered catalyst in the circulating liquid, ounces per gal | 2 to 6 |
| Height of liquid in reactor, feet | 10.0 |
| Velocity of water gas (flow rate), cu. ft. per pound of catalyst per hr | 100 |
| Temperature of liquid in reactor, °F | 460–480 |
| Conversion of CO, per cent | 94.6 |
| Ratio of recycle gas to fresh feed gas | 1.8 |
| Yield of $C_4$ and heavier hydrocarbons, lbs. per 1000 cu. ft. of $CO+H_2$ reacted | 9.0 |

The operation is substantially as described, i. e. the circulating liquid passes out of reactor 1, through 30, valve 31 cooler 33 where it is cooled about 40° to 60° F. and passes on through 42, to pump 9 from which it is forced back into the reactor, chiefly through 10 and 11 but in part through 45, 46 and 47. The recycle gas is introduced by the use of compressor 20 from which the gas is forced through 21, 23 and conduit 3 to reactor 1. When considerable oil mist is carried over in the reactor products passing out through 12 and 13 it will be desirable to employ a mist extractor after 13 and which may be in the top of condenser 14 whereby the mist may be removed and returned to 1 to help keep the level in 1 at L. This is not shown in Figure 2 and is not claimed per se. The coarse grain solids are 1 to 2 millimeter diameter alumina. The reaction products are almost entirely liquid and wax, very little gas being produced. Under the conditions of this example, it is found that low molecular weight hydrocarbons enter reaction and yield products (hydrocarbons) of higher molecular weight when the recycle gas contains the former. This is also shown to be true by the fact that high gas velocity through the reactor favors the production of gaseous and readily liquifiable hydrocarbons whereas at low gas velocity more of the higher molecular weight hydrocarbons form. The products passing to condenser 14 are partly condensed threin and removed through valve 54, whereas the useful gasiform products passing on through 15 to 16 are largely absorbed in 16 and subsequently recovered therefrom by known means, the remaining gases pass out through 17, and partly through 19 and 20 for return to 1. The absorber 16 may be a circulating oil type or a solids-absorbent type apparatus of known design.

It will be obvious that other types of reactions may be conducted within the confines of this invention which is not limited to any particular class of reactions than those that can be conducted catalytically in contact with a catalyst submerged in a liquid vehicle, which vehicle may be a reactant. The basic novelty lies in the employment of a stratified bed of coarse-grain, solid contact materials in a liquid and in promoting chemical reactions in a fluid stream initially containing reactant substance as the stream passes up through the submerged bed serially through the different strata in contact with the solids thereof. Although the examples are specific to the hydrogenation of CO it is possible to treat fluids to the action of $H_2$, $O_2$, $Cl_2$, $H_2O$ vapor, and other reactants and produce reaction products of value. Naphthalen as a liquid in oil or as a vapor mixed with air can be oxidized to phthalic anhydride at 550° to 650° F. using vanadium pentoxide as catalyst. It is preferable to use as granular solids coarse grain vanadium pentoxide. Under such conditions any attrition results in production of the fine-size catalyst; this feature may, of course, be included in the Examples 1 to 4. Again, phenol may be hydrogenated to cyclohexanol using a nickel catalyst at about 500 lbs. pressure and at about 450° F. plus. Olefins may be hydrated to alcohols under superatmospheric pressure, by introducing the olefins in the vapor phase into a water solution of a silver or mercury salt (sulfate preferred) at temperatures below the critical temperature of water. Desulfurization of hydrocarbons (liquid) by passing $H_2$ under superatmospheric pressure through the liquid at 550 to 625° F. (preferably with a small amount of steam, 1 to 2%) may be accomplished in the presence of a catalyst such as molybdenum oxide and alumina. Gum-forming hydrocarbons commonly present in wash oil used for oil scrubbing coke oven gas and the like can readily be oxidized and polymerized by passing hot air through the fouled oil while it is circulating up through the stratified bed of coarse-grain solids.

Summarizing further, it should be noted that in the use of a plurality of coarse-grain catalysts it is desirable that there be appreciable variation in size of particles and in buoyancy so as to minimize efforts in maintaining the layer classification in the fluidized bed. An assortment of sizes is helpful in controlling relative bed densities in the different zones of the bed. The concentration of the powdered catalyst in the liquid circulated through the bed should preferably be in the range 0.5 to 10 per cent, the latter figure applying to very fine powders; usually 1.0 to 5.0 per cent by weight is sufficient. The temperature of the liquid recirculated through the bed may advantageously be 70° to 100° C. below the mean temperature in the fluidized bed. Thus in conducting reactions at 300° to 330° C. as in the reaction of CO with $H_2$ to produce gaseous hydrocarbons the temperature of the feed liquid may be 200 to 260° C. The operating temperature of 300° to 330° C. is about maximum unless appreciable pressure is employed to prevent excessive cracking; with high pressures the minimum operating temperature preferred for the $H_2+CO$ raction is about 200° C. and the maximum about 400° C.

The step of discharging a portion of the upwardly flowing liquid from a zone substantially midway between the top and bottom of the bed is believed to be strictly new in the art; it permits finer adjustment of control over the relative fluid flow rates in the top and bottom zones of the bed and allows for such adjustment of settling rates in the top zone that relative bed densities can be better regulated. Because the intensity of reaction is greater in the bottom half of the bed or liquid stratum than in the upper zone, by virtue of dilution of the stream with products of reaction, it is desirable that the velocity of the liquid in the bottom zone of the bed be greater than in the upper zone thereof. This is another benefit resulting from discharging some of the liquid stream from a zone about midway the top and bottom of the bed; it allows an increase in the settling rate above the midway offtake without appreciably affecting the settling rate in the bottom zone.

Having described the invention so that one skilled in the art can practice it, I claim:

1. The process of promoting chemical reactions in a fluid stream while it passes upwardly through a mass of coarse granular solids confined submerged in a liquid, comprising, passing said fluid stream initially comprising both a liquid and at least one gasiform reactant material adapted to react chemically at elevated temperatures, upwardly through a comon deep bed of said granular solids of diverse sizes and different buoyancies in contact with said solids while they are confined in a reactor at an elevated temperature and pressure favorable for said material to react chemically, at such a velocity that the largest solids are densely fluidized in said fluid stream in a bottom stratum of said bed and the smaller size solids are less densely fluidized largely in an upper zone of said bed, thereby causing said material to react chemically in said stream as it passes upwardly through the stratified bed serially contacting the large and smaller size submerged solids, discharging gasiform products of reaction from above said bed, separately discharging some of the liquid portion of said stream from adjacent the top of said bed at a rate adapted to maintain a substantially constant level of the latter liquid in said reactor above said bed and meanwhile maintaining the desired difference in densities of the bottom and top strata of said bed by discharging a relatively small amount of the liquid portion of said stream from a zone of said bed between the top and bottom strata thereof at a controlled rate.

2. The process of promoting chemical reactions in a fluid stream while it passes upwardly through a mass of coarsely sized granular solids confined immersed in a liquid, comprising, passing said stream, initially comprising said liquid and at least one gasiform reactant material adapted to react chemically at an elevated temperature, upwardly through a deep mass of said solids while they are confined as a bed immersed in said liquid in a reactor at an elevated temperature and pressure favorable for said material to react, which solids comprise particles of different composition A and B and respectively different buoyancies and catalytic activity in said stream, at such a progressively decreasing velocity that said solids are densely fluidized in said liquid substantially in a plurality of stratified layers such that the bottom stratum comprises largely the least buoyant solids of composition A densely fluidized and an upper stratum comprises largely the most buoyant solids of composition B less densely fluidized, whereby said stream is forced to travel over a mobile tortuous course in intimate contact serially with said solids of compositions A and B in its passage upwardly through said bed, thereby reacting said material in said stream, discharging the gasiform products of reaction from said reactor substantially continuously from above said bed, separately discharging the major portion of the liquid portion of said stream, at a rate adapted to maintain the level of the immersing liquid in said reactor, from a zone below but adjacent the top level of said liquid and meanwhile controlling the relative densities of the top and bottom strata of said bed by substantially continuously discharging a relatively small portion of said liquid portion of said stream from a zone of said bed between the top and bottom thereof.

3. The process defined in claim 2 in which said fluid stream in its passage upwardly through the fluidized solids initially contains in suspension a powdered catalyst adapted to catalyze the reaction of said material, and in which said powdered catalyst is discharged from the reactor suspended in the said liquid portion.

4. The process defined in claim 2 in which the temperature in the liquid confining the catalyst solids is of the order of 200° to 400° C.

5. The process defined in claim 2 in which the said fluid stream initially comprises a plurality of gasiform reactants adapted to react with one another at the stated elevated temperature and pressure.

6. The process defined in claim 2 in which the said fluidized solids are within the size range ½ to 1/64-inch in diameter.

7. The process defined in claim 2 in which the said solids of compositions A and B are of different size ranges, the least buoyant solids A initially being within the approximate range ¼ to 1/16-inch diameter and the most buoyant solids B being within the approximate range 1/16 to 1/64-inch in diameter and in which the relative amounts of A and B solids are such that a deep layer of mixed solids forms between the said bottom and top zones of said bed.

8. The process defined in claim 2 in which the said solids are initially substantially uniformly sized but in two different ranges, one range being initially approximately ¼ to 1/16-inch diameter and the other being about ⅛ to 1/64-inch diameter, the solids of the first mentioned range being of greater specific gravity than those of the smaller size range.

9. The process defined in claim 2 in which the reactions promoted are exothermic, in which said fluid stream initially comprised of both a gasiform reactant and a liquid is fed to said reactor at a temperature below reaction temperature, the relative amounts of each being adjusted to maintain the temperature of said solids favorable for the reaction of said reactant and in which stratification of the fluidized solids is promoted by discharging some of said liquid portion of said stream from a zone of said bed between the top and bottom strata thereof.

10. The process defined in claim 2 in which the said fluid stream initially comprises both gasiform and liquid reactant materials, in which said gasiform and liquid reactant materials are caused to react with one another in the fluidized mass and in which said fluid stream is caused to flow upwardly at a decreasing linear velocity over an appreciable portion of its travel through said mass partly by discharging some of the liquid portion of the fluid stream substantially continuously from a zone between the top and bottom zones of the confined, solids-suspending liquid.

11. The process defined in claim 2 in which the said fluid stream comprises CO and $H_2$, the temperature in the said liquid is of the order of 200° to 400° C. and the maximum pressure in the reactor is within the range of about 50 to 2000 pounds gage.

12. The process defined in claim 2 in which the solids of one buoyancy comprise largely a nickel-aluminum alloy and in which solids of a different buoyancy comprise essentially iron.

13. The process defined in claim 2 in which the said fluid stream initially comprises CO and $H_2$ as reactants, the temperature in the liquid confining the solids is of the order of 200° to 400° C., the coarsely sized granular solids of one buoyancy are catalyst comprised essentially of materials selected from the group consisting of nickel, copper, aluminum, cobalt and molybdenum, the coarsely sized solids of a different buoyancy are catalytic and comprised essentially of iron and in which the minimum pressure in the reactor is greater than atmospheric pressure.

14. The process of promoting chemical reactions in a fluid stream while it passes upwardly through a mass of coarse size granular solids confined immersed in a liquid, comprising, passing said stream, initially comprising said liquid and gaseous reactants $H_2$ and CO, upwardly through a deep mass of said solids while they are confined under superatmospheric pressure as a bed immersed in said liquid in a reactor at a temperature of the order of 200° to 400° C., which solids comprise particles of different composition A and B and respectively considerably different buoyancies and catalytic activity in said stream but which are catalytic to the reaction of CO with $H_2$ to form hydrocarbons, the said solids A being catalytic to the formation of largely gaseous reaction products and solids B being catalytic to the formation of liquid reaction products, at such a progressively decreasing velocity that said solids are densely fluidized in said bed in a plurality of strata such that the bottom stratum comprises largely the least buoyant solids and the top stratum of said bed comprises largely the most buoyant solids, thereby reacting said $H_2$ with said CO in said stream as it passes serially through the different strata, discharging the gasiform reaction products substantially continuously from above said bed and separately discharging the liquid portion of said stream, along with liquid reaction products, at a rate adapted to maintain the level of the immersing liquid in said reactor, from adjacent the top level thereof, the relative amounts of the different catalyst solids A and B being adjusted to give the desired proportional amounts of liquid and gaseous reaction products.

15. In the process of promoting chemical reactions in which a fluid stream initially comprising both a gas and a liquid component and containing at least one gasiform reactant material is passed upwardly through a mass of small-size solids confined in a reactor at a reaction temperature at such a velocity that the said solids are fluidized as a deep dense bed immersed in said liquid in said reactor forming a mobile tortuous path of travel for said stream through said bed, and in which said material is reacted chemically in said stream in said bed, the steps comprising, withdrawing substantially continuously a stream of said liquid component along with liquid products of reaction substantially adjacent the top of said bed, cooling it and returning at least a portion of the thus withdrawn liquid to substantially the bottom of said bed as a part of said fluid stream discharging the gasiform reaction products from above the immersing liquid, and controlling the density of the fluidized bed in a zone between the top and bottom thereof by discharging from the latter zone a controlled amount of the immersing liquid as a stream.

16. The process of promoting catalytic exothermic chemical reactions, comprising, passing a fluid stream initially containing at least one reactant and comprised of a gasiform fluid and a liquid, upwardly through a mass of a plurality of different coarsely sized granular catalysts of different composition buoyancy and catalytic activity in said stream while said mass is confined substantially as a deep bed in a reaction chamber substantially at reaction temperature, at such a velocity that said catalysts are densely fluidized submerged in said liquid in said chamber substantially as stratified layers of said bed, the least buoyant catalyst A being disposed largely in the bottom stratum and the most buoyant catalyst B of different catalytic activity being disposed largely in an upper strata of said bed, promoting exothermic chemical reaction in said stream as it flows upwardly through the fluidized mass in said chamber producing at least one gaseous reaction product, discharging said product from said chamber from above said bed, discharging some of the immersing liquid from adjacent the top zone thereof, maintaining the temperature in said mass at about 200° to 400° C. by cooling the discharged liquid and recirculating a portion of it through said mass as a part of said stream, and meanwhile controlling the density of the fluidized bed in a zone thereof above the bottom zone by discharging some of the immersing liquid from at least one level between the top and bottom zones of said bed.

17. The process of promoting chemical reactions of a gasiform fluid while it passes upwardly through a mass of coarse granular catalyst solids confined immersed in a liquid in a reactor, comprising, passing a gasiform stream, initially containing at least one reactant material adapted to react chemically at elevated temperatures, upwardly through a deep bed of said solids while they are confined immersed in said liquid in a reactor, at a suitable pressure and elevated temperature for said material to react chemically, meanwhile also passing a stream of said liquid upwardly through said bed in contact with said solids, so controlling the combined flow rates of the streams that said solids are densely fluidized in said immersed bed, thereby causing the said material to react chemically catalytically as it passes through said bed, discharging gasiform products of reaction from above the immersing liquid level and separately removing the liquid stream from said reactor at a plurality of levels one adjacent the top level of the immersing liquid and one adjacent the middle of said bed, thereby decreasing the linear velocity of said liquid as it flows through said bed.

18. In the process of contacting a gasiform fluid stream with a mass of small-size solids of divers buoyancy characteristics while said solids are confined as a deep bed submerged in a liquid in an elongated chamber, wherein said fluid stream passes up through said bed at such a velocity that said solids are densely fluidized in a plurality of strata in said bed in said liquid, the steps comprising, introducing a stream of said liquid into said chamber adjacent the bottom of said bed simultaneously with the introduction of said gasiform fluid into said bed, passing both streams up into the bed of fluidized solids in contact therewith, discharging a portion of the liquid stream from adjacent the top of said bed, discharging another, smaller portion of said liquid stream from a level between the top and bottom of said bed for the purpose of controlling the density of the fluidized bed in that portion above the bottom stratum thereof, and so controlling the total rate of discharge of the liquid stream from said chamber that the liquid level is maintained substantially constant therein above said bed.

19. The process defined in claim 18 in which a gasiform fluid is also introduced into said bed in said chamber at a level between the top and bottom of said bed.

20. The process defined in claim 18 in which portions of said liquid stream are discharged from said chamber from a plurality of levels between the top and bottom of said bed.

21. The process of promoting chemical reactions in a fluid stream while it passes upwardly through a mass of coarse granular contact solids confined submerged in a liquid, comprising, passing said stream initially comprising both a refractory oil and a gaseous mixture comprised essentially of CO and $H_2$, upwardly through a progressively expanding deep bed of said solids while it is confined submerged in said oil in an elongated reaction chamber at a temperature of the order of 200° to 400° C., at such a velocity that said solids, which are of diverse buoyancies and catalytic to the reaction of $H_2$ with CO, are initially densely fluidized in the bottom zone of said bed and less densely fluidized in an intermediate zone between the top and bottom thereof, promoting catalytic reaction of the CO and $H_2$ initially present in said stream thereby forming hydrocarbons in said stream, increasing the bed density in said intermediate zone by withdrawing some of the liquid portion of said stream from the latter zone, separately discharging the gasiform reaction products in said stream from above the top level of said liquid and meanwhile discharging another stream of said liquid from adjacent the top level thereof at a rate adapted to maintain a substantially constant liquid level in said chamber.

22. In the process of promoting chemical reactions wherein a gasiform stream initially containing reactant substance is passed at a suitable reaction temperature upwardly through a deep bed of small size contact solids of diverse buoyancies in contact with them while they are confined in a suitable reactor submerged in a liquid, at such a velocity that the said solids are densely fluidized in said bed in stratified layers of different bed-densities the most buoyant solids being disposed in the uppermost layers therein, in which the immersing liquid simultaneously flows as a stream upwardly also through said bed in contact with said solids and in which said substance is reacted chemically in said gasiform stream as the latter stream passes through said bed, the step comprising, removing a portion of the liquid stream from a region of said bed between the top and bottom thereof to maintain the desired difference between the bed-densities of the top and bottom strata of said bed.

WILLIAM W. ODELL.

References Cited in the file of this patent

UNITED STATES PATENTS

| Number | Name | Date |
|---|---|---|
| 2,433,072 | Stewart et al. | Dec. 23, 1947 |
| 2,438,029 | Atwell | Mar. 16, 1948 |
| 2,443,673 | Atwell | June 22, 1948 |
| 2,486,243 | Atwell | Oct. 25, 1949 |
| 2,503,291 | Odell | Apr. 11, 1950 |